(12) United States Patent
Cho

(10) Patent No.: US 7,995,100 B2
(45) Date of Patent: Aug. 9, 2011

(54) APPARATUS FOR CONTROLLING SPECIFIC FUNCTION AND CAMERA MODULE HAVING THE SAME

(75) Inventor: Se-hoon Cho, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1120 days.

(21) Appl. No.: 11/174,747

(22) Filed: Jul. 5, 2005

(65) Prior Publication Data

US 2006/0114496 A1 Jun. 1, 2006

(30) Foreign Application Priority Data

Nov. 30, 2004 (KR) .................. 10-2004-0099018

(51) Int. Cl.
 *H04N 5/232* (2006.01)
(52) U.S. Cl. .................. 348/211.1; 348/374; 455/456.4
(58) Field of Classification Search ............... 348/211.2, 348/211.1, 211.99, 211.4, 211.5, 211.11, 348/552, 373; 455/456.1–456.6
See application file for complete search history.

(56) References Cited

U.S. PATENT DOCUMENTS

| | | | |
|---|---|---|---|
| 4,686,513 A | 8/1987 | Farrar et al. | |
| 4,791,409 A | 12/1988 | Reid | |
| 6,104,281 A | 8/2000 | Heinrich et al. | |
| 7,349,671 B2 * | 3/2008 | Hirai | 455/73 |
| 2003/0157903 A1 * | 8/2003 | Begic | 455/90 |
| 2004/0046871 A1 * | 3/2004 | Ichikawa et al. | 348/207.99 |
| 2004/0204065 A1 * | 10/2004 | Kota et al. | 455/556.1 |
| 2005/0075117 A1 * | 4/2005 | Jang | 455/456.4 |
| 2006/0019696 A1 * | 1/2006 | Brunel et al. | 455/550.1 |

FOREIGN PATENT DOCUMENTS

| | | | |
|---|---|---|---|
| CN | 1463141 A | | 12/2003 |
| CN | 1469622 A | | 1/2004 |
| JP | 2004201222 A | * | 7/2004 |
| WO | WO 2004038940 A1 | * | 5/2004 |

\* cited by examiner

*Primary Examiner* — Nelson D. Hernández Hernández

(74) *Attorney, Agent, or Firm* — Drinker Biddle & Reath LLP

(57) ABSTRACT

An apparatus controlling a specific function is provided. The specific function controlling apparatus includes a signal generator and a recognizer. The signal generator transmits and receives a first signal of a specific frequency. The recognizer is installed in a specific function module having a specific function device for executing a specific function. The specific function module is installed in an electronic equipment. The recognizer includes an antenna part and a control part. The antenna part is responsive to the specific frequency of the signal generator. The control part is electrically connected to the specific function device and the antenna part to control the specific function according to the first signal.

10 Claims, 5 Drawing Sheets

APPARATUS FOR CONTROLLING SPECIFIC FUNCTION AND CAMERA MODULE HAVING THE SAME

This application claims the priority of Korean Patent Application No. 10-2004-0099018, filed on Nov. 30, 2004, in the Korean Intellectual Property Office, the disclosure of which is incorporated herein in its entirety by reference.

BACKGROUND OF THE INVENTION

1. Field of the Invention

The present invention relates generally to an apparatus for controlling the operation of a specific function module that is installed in an electronic equipment, and more particularly to an apparatus for selectively disabling and enabling a camera module that is installed in a portable electronic device, and a camera module having the apparatus.

2. Description of the Related Art

A camera module capable of capturing an image and a voice recording module capable of recoding a voice are now being included in various portable electronics devices such as a PDA, a notebook PC and a wireless phone.

For example, a camera module capable of taking a photograph can be built in a cellular phone. Such a camera module is constructed to include an image sensor module and a lens housing installed at one side of the image sensor module. The image sensor module is equipped with an image pickup device that is electrically connected to a main board of the cellular phone by, for example, a flexible printed circuit board (FPCB). Thus, the FPCB sends an image pickup signal to a main board of the cellular phone for processing, storage or transmission.

However, in specific places requiring security and privacy protection, for example, a security zone—a place requiring protection of technical materials and manpower of an enterprise, and places preventing photographing or recording activity (such as a bathhouse, a swimming pool, a conference room, and the like), it is necessary to control the use of devices such as the foregoing mentioned electronic devices that are capable of recording sensitive information. In this case, conventionally, the use of such devices is prohibited by a security search to locate the device and through an additional security procedure, such as, for example, confiscation of the device, attachment of a security tag or tape on a camera lens of the camera device to prevent photographing and the like.

In this case, the security search and the resulting additional procedure require manual tasks, thereby causing inconvenience and consuming a lot of time. Also, the manual security search cannot securely identify whether or not a corresponding device exists. Moreover, unreasonably, a main and/or unrelated function of the device may also be restricted when restricting the use of the device's specific function such as photographing or sound recording.

SUMMARY OF THE INVENTION

The present invention provides a specific function controlling apparatus and a camera module having the same, the controlling apparatus being capable of automatically disabling and enabling a specific function module of a portable terminal without having to manually search for whether or not the specific function module is actually built in the portable terminal, or whether or not the specific function is actually used.

According to an aspect of the present invention, there is provided a specific function controlling apparatus including a signal generator and a recognizer. The signal generator transmits and receives a first signal of a specific frequency. The recognizer is installed in a specific function module having a specific function device for executing a specific function. The specific function module is installed in an electronic equipment. The recognizer includes an antenna part and a control part. The antenna part is responsive to the specific frequency of the signal generator. The control part is electrically connected to the specific function device and the antenna part to control the specific function according to the first signal.

The signal generator may include a reader electromagnetically communicating with the recognizer and a writer transmitting given information to the recognizer and writing the given information in an assigned area of the recognizer.

According to another aspect of the present invention, there is provided a camera module including an image sensing module and a recognizer. The image sensing module includes an image sensor, an electrical connection member electrically connecting the image sensor to an electronic equipment, and at least one lens located at least one side of the image sensor. The recognizer is installed in the image sensing module, and includes an antenna part to receive signals of a specific frequency, and a control part controlling an image sensing function of the image sensing module according to a signal induced by the antenna part.

Accordingly, the present invention makes it possible to automatically deactivate and subsequently reactivate a specific function of a specific function module that is installed in a portable terminal by using a recognizer installed in the specific function module. Also, the present invention does not require additional elements for installing the recognizer, thereby making it possible to prevent an increase in a size of a camera module and an additional expense.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
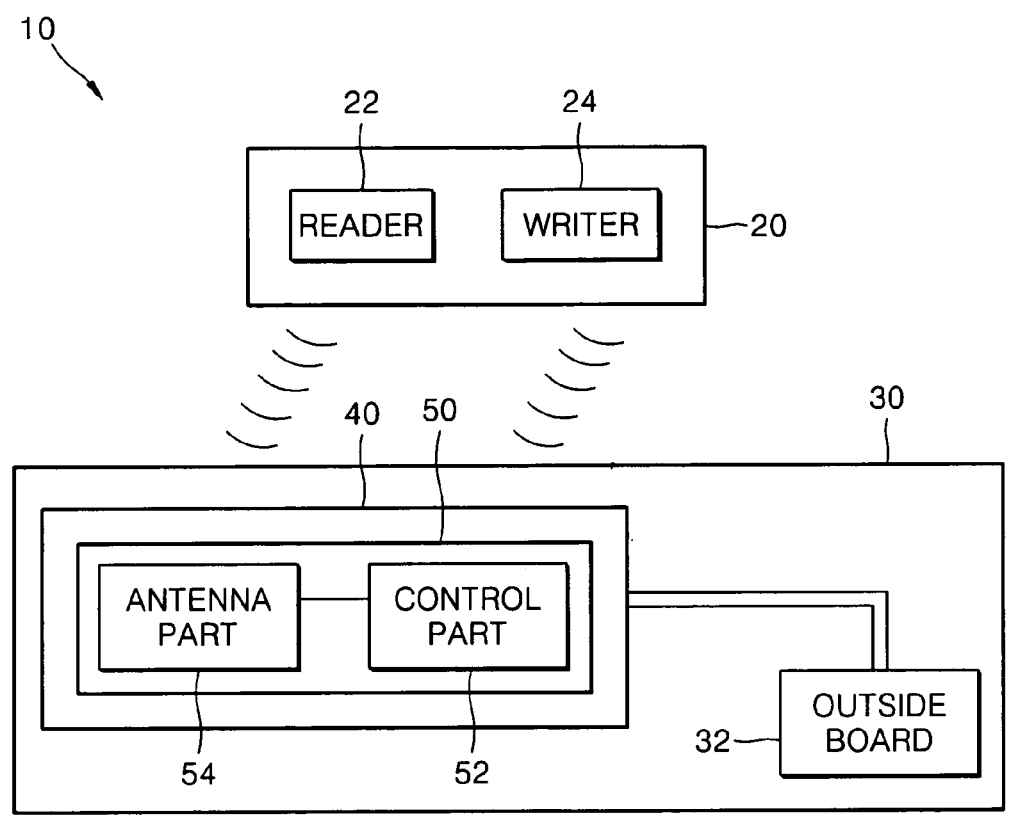
FIG. 1 is a block diagram of an apparatus for controlling a specific function of an electronic equipment according to the present invention.

FIG. 1 is a block diagram of an apparatus for controlling specific functions according to the present invention.

Referring to FIG. 1, the apparatus for controlling specific functions 10 includes a signal generator 20 and a recognizer 50.

Herein, the specific function is performed by a specific function module 40 that is built into an electronic equipment 30 (e.g., a PDA, wireless phone, notebook PC, etc.) The specific function module 40 includes a specific function device (not shown) and an electrical connection member for connecting the specific function device to an outside board 32 of the electronic equipment 30.

The signal generator 20 is configured to generate a first signal. The recognizer 50, which is combined with the specific function module 40, includes an antenna part 54 and a control part 52.

The antenna part 54 is installed in the specific function module 40, transmits a signal of a specific frequency to the signal generator 20, and receives the first signal from the signal generator 20. The control part 52 is connected to the antenna part 54 to thereby control a specific function according to the first signal of the signal generator 20.

One embodiment of the present invention makes it possible to control a specific function of the specific function module 40 by using a radio frequency identification (RFID) technique. That is, the embodiment can control a specific function by using an RFID transponder antenna as the antenna part 54, an RFID transponder chip as at least a portion of the control part 52, and an RFID reader as the signal generator 20.

In this embodiment, a frequency that is employed for the RFID technique is of a high frequency band. In a process that is known in the art as interrogation, the RFID transponder chip, which is passive (i.e., powered by inductive coupling via the RFID transponder antenna), transmits a signal back to the signal generator 20 when the RFID transponder (also known as a "tag", and referred to as such hereinafter) is disposed in an electromagnetic field that is generated from the signal generator 20. Also, in case of a superhigh frequency band, a signal can be transmitted differently from the above method.

In detail, the recognizer 50 has a tag ID area wirelessly recognized with information about the specific function module 40 and transmits the tag ID area through the RF antenna (the antenna part 54) to an RF reader (the signal generator 20) that is disposed outside the electronic equipment. Accordingly, the signal generator 20 is operative to discriminate a specific module 40 by its transmitted ID and, therefore, can control the specific function of the electronic equipment.

In this case, as shown in FIG. 1, the signal generator 20 includes a reader 22 (e.g., a radio receiver) for receiving an electromagnetic signal from the antenna part 54 and a writer 24 (e.g., a radio transmitter) for transmitting a first signal and a second signal to the antenna part 54. In other embodiments, the signal generator 20 may include a transceiver for performing the foregoing-described functions.

Thus, a given function of the electronic equipment can be temporarily deactivated in a designated area where a specific function is not allowed. For example, when the signal generator 20 that is installed at a given doorway perceives the existence of the specific function module 40, the signal generator 20 generates and transmits a first signal for temporarily deactivating a specific function of a corresponding device, and the antenna part 54 receives the first signal and transmits the same to the control part 52. The control part 52 includes a switching signal area for controlling a specific function by turning on/off the specific function. Accordingly, the recognizer 50 can temporarily deactivate the specific function.

Figure 2:
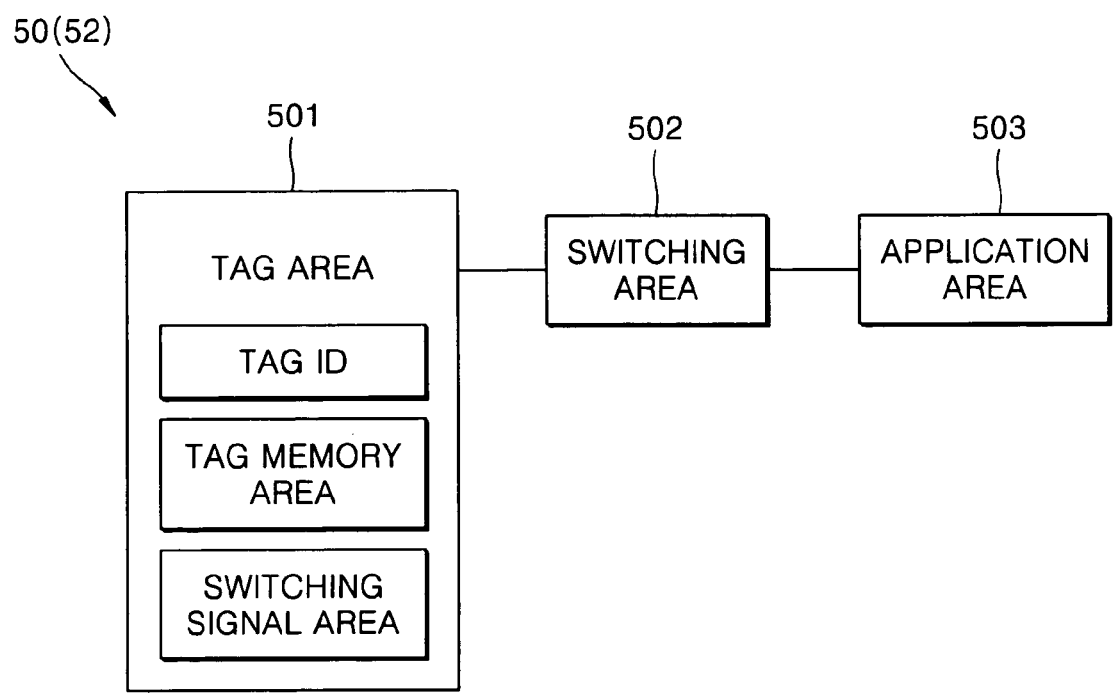
FIG. 2 is a block diagram illustrating respective areas of a recognizer shown in FIG. 1.

The recognizer 50 (specifically, the control part 52) can be divided into a tag area 501 (e.g., a memory), a switching area 502 and an application area 503 (e.g., the areas 502 and 503 comprising a processor such as a microprocessor, DSP or the like) as shown in FIG. 2. The tag area 501 includes a tag ID area for identifying a tag, a tag memory area for memorizing tag information, a switching signal generation area for generating a switching signal encoded to generate a specific function. The switching area 502 turns on/off a switching signal from the tag area 501. The application area 503 deactivates the set specific function under the control of the switching area 502.

The switching area 502 controls signal flow according to an additionally received encoding signal that is received in the tag area 501. Thus the application area 503 that is connected to the switching area 502 can control operation signal flow.

In the meantime, the specific function controlling apparatus 10 shown in FIGS. 1 and 2 can deactivate a specific function and can subsequently reactivate the deactivated specific function. That is, upon reception of the first signal from the signal generator 20 the recognizer 50 deactivates a specific function, and upon reception of the second signal from the signal generator 20 the recognizer 50 reactivates the deactivated specific function. That is, the switching area 502 is encoded by the first signal, and when the tag area 501 identifies the second signal, the switching area 502 decodes the encoding so that the switching area 502 can reuse the deactivated specific function.

In the meantime, the signal generator 20 may include the reader 22 and the writer 24 as stated above. In this case, the writer 24 may include a random number generator or other signal-encoding means known in the art for effecting an encoding function to transmit an encoded signal to the recognizer 50.

Figure 3:
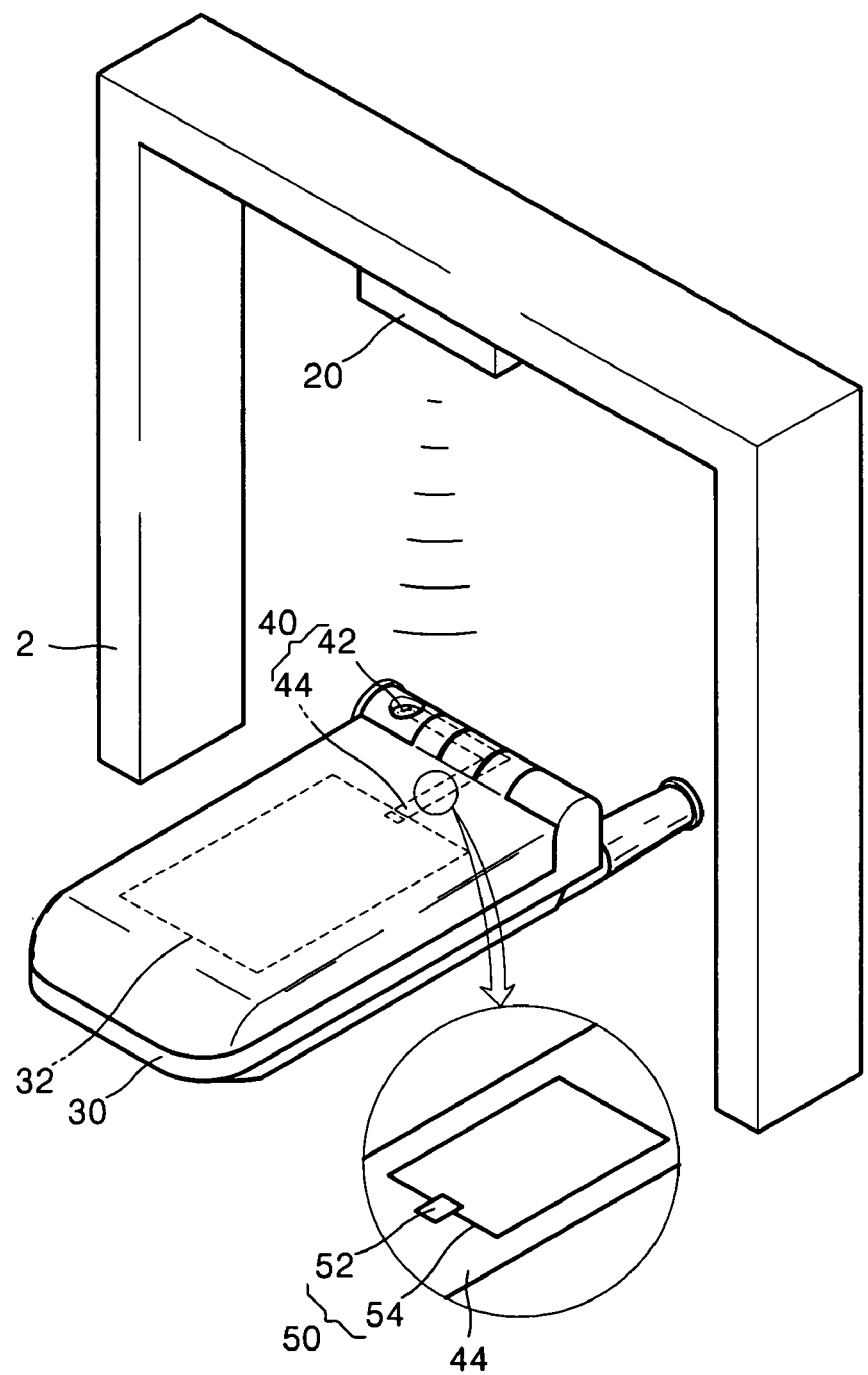
FIG. 3 is a schematic view illustrating an example of an electronic equipment having a structure of the specific function controlling apparatus shown in FIG. 1.

FIG. 3 is a schematic view illustrating an example of an electronic equipment having a structure of the specific function controlling apparatus.

As shown in FIG. 3, one example of the electronic equipment 30 is a cellular phone wherein the specific function module 40 is a camera module for photographing an object. In this example the outside board 32 may be a main circuit board of the cellular phone and an image sensor 42 of the camera module is electrically connected to the main board 32 of the cellular phone by an electrical connection member 44. Accordingly, the camera module photographs an object according to a signal of a device (e.g., a processor) that is installed on the main board.

The recognizer 50 can be simply built in the cellular phone 30 such that, for example, a circuit-patterned antenna part 54 is installed at the electrical connection member 44 and the control part 52 is attached at a given part of the antenna part 54 or at a side of the outside board 32 at which the image sensor 42 connects.

Also, a search unit 2 for prohibiting a photographing activity is installed at a doorway of a place prohibiting a photographing activity. Here, the signal generator 20 is installed at the search unit 2.

Accordingly, when the cellular phone is passed through the search unit 2, the reader 22 of signal generator 20 receives an electromagnetic wave of a specific frequency induced by the antenna part 54, whereby the writer 24 of the signal generator 20 generates and emits a first signal for deactivating a photographing function of the camera module. Upon reception of the first signal from the writer 24, the antenna part 54 transmits the first signal to the control part 52, whereby the control part 52 deactivates the photographing function of the camera module.

Further, when the cellular phone is passed through the search unit 2 in the reverse direction, the writer 24 re-detects the camera module, whereby the signal generator 20 generates and emits a second signal for reactivates the deactivated photographing function of the camera module. Upon reception of the second signal from the signal generator 20, the antenna part 54 transmits the second signal to the control part 52, whereby the recognizer 50 reactivates the deactivated photographing function of the camera module.

Figure 4:
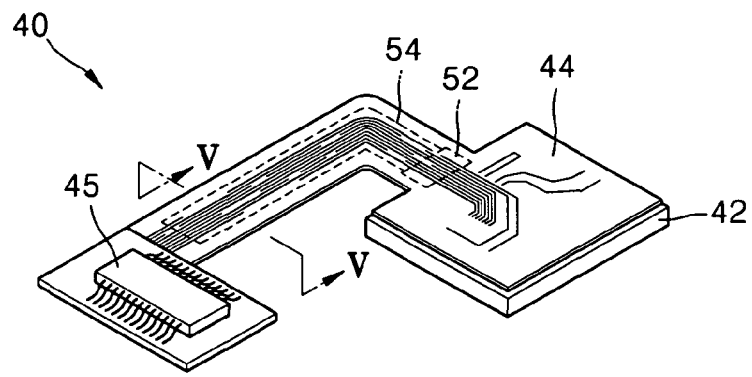
FIG. 4 is a perspective view illustrating an example of a specific function module with the specific function controlling apparatus shown in FIG. 2.

FIG. 4 is a perspective view illustrating an example of a specific function module equipped with the specific function controlling apparatus shown in FIG. 2.

Referring to FIG. 4, an antenna part 54 may be configured, for example, on an electrical connection member 44 that is installed in a specific function module 40. In this case, the electrical connection member 44 includes both a PCB having a specific function device 42 attached thereon and another PCB (for example, an FPCB) for connecting the specific function device 42 with an outside board 32. In this case, a connector 45 is positioned at one end of the electrical connection member 44, and the connector 45 is connected to the outside board 32.

In case where the antenna part 54 is disposed on the electrical connection member 44, the antenna part 54 may be formed while a general circuit pattern is deposited or otherwise formed on the member 44. In this case, the control part 52 may be installed in the electrical connection member 44 in a mounting part (not shown) that securely mounts the specific function device 42 to the member 44 or to, for example, a housing of the module 40. As can be appreciated, when the antenna part 54 is disposed on the electrical connection member 44, the size of the specific function module 40 and the production cost of incorporating a recognizer 50 (e.g., RFID tag) are not significantly increased.

Figure 5:
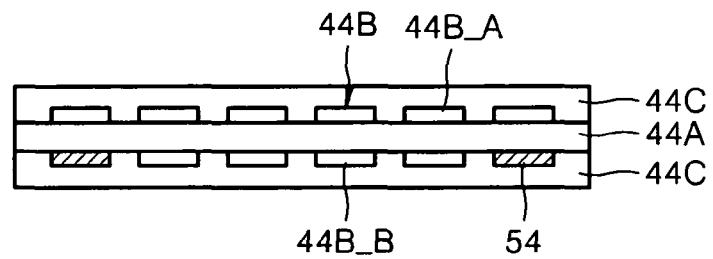
FIG. 5 is a cross-sectional view of the specific function module taken along line V-V in FIG. 4.

FIG. 5 is a cross-sectional view of a side of the specific function module taken along line V-V in FIG. 4.

As an example where the antenna part 54 is disposed on the electrical connection member 44, the electrical connection member 44 may be formed of a FPCB as shown in FIGS. 4 and 5. Accordingly, the electrical connection member 44 may include a base film 44A including a circuit pattern layer 44B and an insulator layer 44C formed thereon. The base film 44A may be of a polyimide material or a polyester material and the circuit pattern layer 44B is deposited on at least one side of the base film 44A. The circuit pattern layer 44B includes a connection circuit pattern layer 44B_A for connecting the specific function device 42 with the outside board 32 and a dummy circuit pattern layer 44B_B. The circuit pattern layer 44B is covered with the insulator layer 44C.

In this example, the dummy circuit pattern layer 44B_B is operative to prevent cracks from forming in the electrical connection member 44 and also is operative to prevent the twist of the electrical connection member 44 that is caused due to a difference between thermal expansion coefficients of the connection circuit pattern layer 44B_A and the base film 44A. As shown in FIG. 5, the antenna part 54 can be positioned on the same surface of the base film 44A as the dummy circuit pattern layer 44B_B. In addition, the antenna part 54 can also function as the dummy circuit pattern layer 44B-B so that the size of the specific function module 40 is not increased and the antenna part 54 can be simply manufactured. In FIG. 5, although the dummy circuit pattern layer 44B_B is deposited on a surface of base film 44A that is opposite to the base film surface 44A on which the connection circuit pattern layer 44B_A is disposed, in some embodiments the dummy circuit pattern layer 44B_B may be deposited on the same surface of the base film 44A as where the connection circuit pattern layer 44B_A is disposed.

Figure 6:
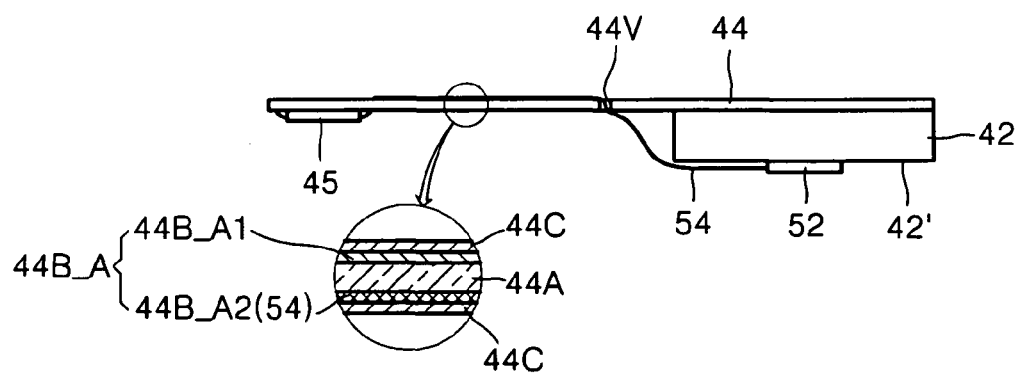
FIG. 6 is an elevation view illustrating another example of a specific function module with the specific function controlling apparatus shown in FIG. 2.

As shown in FIGS. 5 and 6, the electrical connection member 44 may be a double-sided FPCB in which the connection circuit pattern layer 44B_A connects the specific function device 42 with the outside board and is patterned at both sides of the base film 44A. In this case, when a circuit pattern layer 44B_A1, which is directly connected to the specific function device and the outside board and has a plurality of circuit patterns deposited thereon, is arranged on a front surface of the base film 44A, the antenna part 54 may be arranged on an circuit pattern layer 44B_A2 that is deposited on a rear surface of the base film 44A. Accordingly, an electromagnetic interference between the antenna part 54 and the circuit pattern layer 44B_A1 is prevented or minimized, so that the antenna part 54 can transmit and receive a noise-free accurate RF signal. In this case, the circuit pattern payer 44B_A and the antenna part 54 are covered with the insulator layer 44C.

As shown in FIG. 6, the control part 52 may be arranged on a lower surface of the specific function device 42. Also, the antenna part 54 connected to the control part 52 may be configured to pass through the base film 44A by a via hole 44V that is formed at the electrical connection member 44. Alternatively, the control part 52 may be built in the specific function device 42 or may be installed in the electrical connection member 44.

According to an aspect of the present invention, the antenna part 54 is formed at one end of the electrical connection member 44 that is installed in the specific function module 40 and the control part 52 is mounted on the specific function device 42 or the electrical connection member 44. In this case, the specific function module is a camera module having a photographing function as described above, and the recognizer 50 can control the photographing function according to the first signal of the signal generator 20.

In case where the specific function module is a voice recording module having a voice recording function, the control part 52 can control the voice recording function according to the first signal of the signal generator 20. Moreover, one can appreciate that when the electronic equipment includes several specific function modules or a module with several specific functions that are subsidiary to the main function of the electronic equipment, that the recognizer 50 can be configured to separately and independently control the disabling and enabling of each function.

Figure 7:
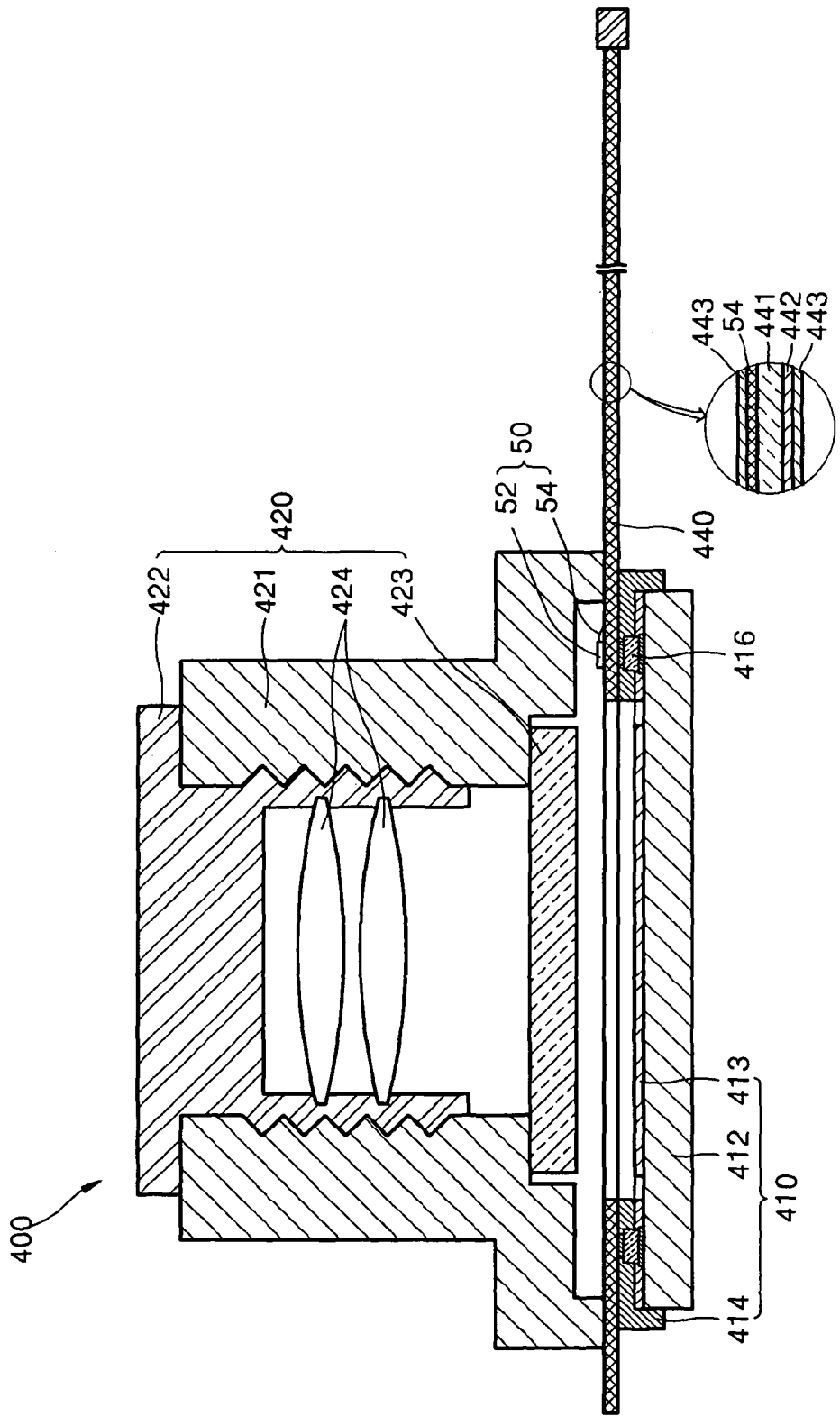
FIG. 7 is a sectional view illustrating a camera module with the specific function controlling apparatus shown in FIG. 1.

FIG. 7 is a sectional view illustrating a camera module 400 with the specific function controlling apparatus 50.

Referring to FIG. 7, the camera module 400 includes an image sensing module 410, a lens module 420, an electrical connection member 440 and a recognizer 50 that includes an antenna part 54 and a control part 52.

The image sensing module 410 includes an image sensor 412 electrically connected to the electrical connection member 440 to pick up an outside image.

An image pickup area for sensing incident light and converting the light into an electrical signal is positioned in the image sensor 412. For example, the image sensor 412 may be a charge-coupled device (CCD), a complementary metal oxide semiconductor (CMOS), or the like.

The electrical connection member 440 may be a typical PCB, an FPCB such as a tape carrier package (TCP), a chip on film (COF) or the like according to the types of the applications of the image sensing module 410. Here, an analog-to-digital converter (ADC) circuit for converting an analog electrical signal of the image pickup area into a digital signal may be arranged in the electrical connection member 440. In this case, the image sensor 412 is connected to one end of the electrical connection member 440 by bump 416 or another bonder, and a connector connected to an outside board is formed at the other end of the electrical connection member 440.

If the electrical connection member 440 is a FPCB, the electrical connection member 440 includes a base film 441 generally formed of a polyimide material or a polyester material, a circuit pattern layer 442 patterned on the base film 441, and an insulator layer 443 formed on the circuit pattern layer 442.

The lens module 420 includes a lens housing 421 and one or more lenses 424. In this case the lens housing 421 may have an opening part that is inserted by a lens holder 422 receiving one or more lenses 424. Also, the lens module 420 may further include a filter 423. The filter 423 blocks infrared rays entering the lens housing 421, and prevents the reflection of entered light. The filter 423 is installed at a lower part of a hollow of the lens housing 421. An infrared cut coating (IR-Cut coating) is positioned on an upper surface of the filter 423, and an anti-reflection coating is positioned on a lower surface of the filter 423.

The camera module 400 includes a recognizer 50 equipped with an antenna part 54 and a control part 52. The recognizer 50 as previously described is operative to selectively prevent and enable the camera module 400 from picking up an image of an object according to a signal of the signal generator 20 (See FIG. 1).

The antenna part 54 transmits a signal of a specific frequency to the signal generator 20 when it receives the first signal from the signal generator 20. The control part 52 is connected to the antenna part 54 to deactivate the image pickup function according to the first signal.

In detail, the signal generator 20 arranged outside of the camera module 400 identifies the existence of the camera module 400 through the antenna part 54, and temporarily deactivates the image pickup function of the camera module 400 in a place where a photographing activity is prohibited. That is, when the existence of the camera module 400 is detected by the signal generator 20 (See FIG. 3) installed at a given doorway, the signal generator 20 generates and transmits the first signal for deactivating a specific function, whereby the recognizer 50 deactivates the image pickup function.

In this case, the recognizer 50 may be divided into the tag area 501, the switching area 502 and the application area 503 as shown in FIG. 2.

The antenna part 54 may be installed in the electrical connection member 440. In this case, the antenna part 54 may be embodied by the circuit pattern layer 442 patterned on the electrical connection member 440. That is, the electrical connection member 440 may include the base film 441, the circuit pattern layer 442 and the insulator layer 443, and the antenna part 54 may be formed of a partial circuit pattern of the circuit pattern layer 442. The base film 441, the circuit pattern layer 442 and the insulator layer 443 are respectively substantially similar to the base film 44A, the circuit pattern layer 44B and the insulator layer 44C that are shown in FIGS. 4 through 6. Also, the antenna part 54 may be formed on a side of a filter or a protection unit of the camera module. In one example, the antenna part 54 may be at least partially exposed to the outside where by the antenna part 54 is not shielded and may be more easily perceived by the signal generator 20.

Also, the electrical connection member 440 may be directly and electrically connected to the electronic equipment in a mounting part (generally, a substrate) mounting the image sensor 412. In this case, the antenna part 54 may be formed on the mounting part's surface on which the specific function device is formed.

As stated above, the control part 52 may be installed in the electrical connection member 440 or in a substrate securely mounting the image sensor 412. Accordingly, additional space for installing the antenna part 54 is not required in the camera module 400, whereby the camera module 400 is not increased in its size and the production process of the antenna part 54 is simplified.

The signal generator 20 (See FIG. 1) can generate the first signal and the second signal. That is, when the recognizer 50 of the camera module 400 secondly performing an image pickup function is perceived through the same doorway, the signal generator generates the second signal. Upon reception of the second signal from the signal generator, the control part 52 reactivates the deactivated specific function.

As described above, the present invention can automatically deactivate and reactivate a specific function of a specific function module built in a portable device by using the recognizer installed in the specific function module, thereby making it possible to reduce a security search time and to accurately perform the security search.

Also, the antenna part can be installed in a conventional cameral module attached at a cellular phone, and the control part can be attached on the mounting part mounting the image sensor, whereby additional elements for installing the recognizer is not required. Accordingly, the size of the camera module is not increased and an addition expense is not required.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A portable electronic device comprising:
   an image sensing module including an image sensor, an electrical connection member having a connector for electrically connecting the image sensor to a circuit board of the portable electronic device and a lens module having a lens housing, a lens holder, and at least one lens, the lens module and the image sensor being disposed on at least one side of the electrical connection member and in optical communication therewith; and
   a recognizer that is connected with the image sensing module and includes an antenna disposed on the electrical connection member for receiving a control signal of a specific frequency from a signal generator and a control module connected with the antenna for selectively enabling and disabling operation of the image sensing module according to the control signal,
   wherein:
   the control module is installed in the electrical connection member or in a substrate securely mounting the image sensor; and
   the antenna disposed on the electrical connection member is disposed within a region covered by the lens housing.

2. The portable electronic device of claim 1, wherein the recognizer deactivates the image sensing module relative to a first signal and re-activates the image sensing module relative to a second signal.

3. The portable electronic device of claim 1, wherein the control module is integral with the image sensor.

4. The portable electronic device of claim 1, wherein the antenna is integral with the electrical connection member.

5. The portable electronic device of claim 4, wherein the electrical connection member comprises a base film having a connection circuit pattern layer that is patterned on a first side of the base film to connect the image sensing module to the electronic equipment, and the antenna is disposed on a second side of the base film.

6. The portable electronic device of claim 1, wherein the recognizer is integral with the electrical connection member.

7. The portable electronic device of claim 1, wherein the recognizer is integral with the image sensing module.

8. The portable electronic device of claim 1, wherein the recognizer comprises an RFID transponder.

9. A camera module for a portable electronic device, the camera module comprising:
- a circuit board that includes a first portion, a second portion having a connector for mating with a circuit board of the portable electronic device and a third portion that is at least partially flexible and connecting the first and second portions;
- an image sensor mounted on the first portion and including at least one of a charge-coupled device and a complementary metal oxide semiconductor;
- a first circuit pattern on at least one surface of the circuit board, wherein the first circuit pattern is configured to electrically connect the image sensor with the connector;
- a second circuit pattern on at least one surface of the circuit board, wherein the second circuit pattern is operative to transmit and receive a wireless signal;
- a control part mounted on the circuit board such that the control part is in electrical connection with the second circuit pattern and with the image sensor; and
- a lens module having a lens housing, a lens holder, and at least one lens, the lens module being disposed on at least one side of the circuit board and in optical communication therewith.

10. The camera module of claim 9 wherein the first circuit pattern is disposed on a first surface of the circuit board and the second circuit pattern is disposed on a second surface of the circuit board that is different from the first surface.

* * * * *